J. ROBISON.
Upsetting Tires.
No. 62,501.  
Patented Feb. 26, 1867.
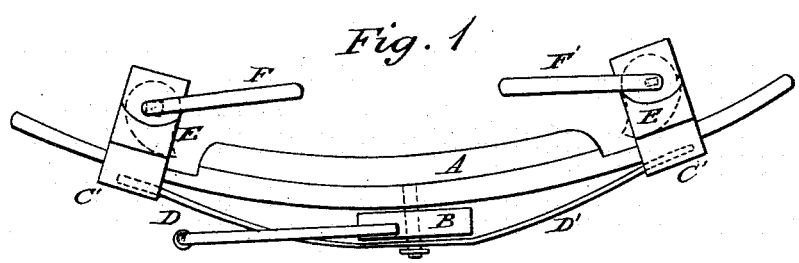
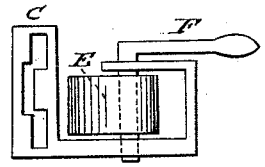
Witnesses:  
John L. Lewis  
Marquis Robison
Inventor:  
Joseph Robison

United States Patent Office.

JOSEPH ROBISON, OF JOHNSON'S CREEK, NEW YORK.

Letters Patent No. 62,501, dated February 26, 1867.

IMPROVEMENT IN TIRE SHRINKERS.

*The Schedule referred to in these Letters Patent and making part of the same.*

TO ALL WHOM IT MAY CONCERN:

Be it known that I, JOSEPH ROBISON, of Johnson's Creek, in the county of Niagara, and State of New York, have invented a new and useful Improvement in Tire Shrinkers; and I do hereby declare that the following is a full, clear, and exact description of the construction and operation of the same, reference being had to the annexed drawings, making a part of this specification, in which—

Figure 1 is a birdseye view of the whole shrinker.

Figure 2 is a vertical section of the clasp.

The letters of reference refer to the same parts in each figure.

A is the base-plate. It is made of iron and in form the segment of a circle. It may be flanged at the inner edges, if desired. The ends of this plate are made in two parallel parts, so that projections in the clasps C may slide between them freely. B is a roller or wheel. It is pivoted to the outside of the plate A at the centre. It is provided with holes or pins to connect the connections D and D' to it, and a hole or mortise in the periphery to insert a lever to turn it with. C and C' are sliding clasps. They are made to surround the ends of the plate A and a projection that will slide within the openings of the ends of the plate. Through the outer band of the clasps and these projections are holes for pins or bolts that hold the ends of the connections D and D'. These clasps are made to extend inward, as shown in the figure, so as to receive and hold the eccentrics E and E'. D and D' are connections. One end of each is pivoted to the clasps C. The other ends are bolted or pivoted to the roller B in such manner that when the roller is turned it will draw the clasps toward each other, and when the roller is turned the other way the clasps will move from each other. E and E' are eccentrics, made and placed as shown in the figures. Their use is to hold the tire firmly against the inner surface of the plate A. They should have a square hole through them, so that their positions may be changed with respect to the levers F to suit the pleasure of the user. Their eccentricity should be such that they may be turned so as to receive the thickest tire or other iron that requires shrinking, and be turned to clasp the thinnest iron that may require shrinking; or they may be provided with two holes through them, one hole more eccentric than the other. F and F' are levers made and used to actuate the eccentrics E and E' any length or size required. They are bent nearly at right angles before they enter the clasps, so that they will pass down through the clasps and the eccentrics, and the part that is within the eccentrics must be square and made to fit the hole through them. The parts that are to be within the clasps must be round so as to turn freely in the holes through the clasps. These form a support and pivot for the eccentrics.

Having thus fully described my invention, I do not claim any part of the invention that was secured to me by Letters Patent of the United States on the twenty-third day of September, one thousand eight hundred and sixty-two; but what I do claim, is—

The clasps C and C' and the eccentrics E and E', when made as specified and used in combination with the other parts as herein set forth.

JOSEPH ROBISON,

Witnesses:
JOHN L. LEWIS,
MARQUIS ROBISON.